US012618426B1

(12) United States Patent
Ma et al.

(10) Patent No.: US 12,618,426 B1
(45) Date of Patent: May 5, 2026

(54) INTERLOCKING CONNECTOR ASSEMBLY FOR SHADING STRUCTURE

(71) Applicants: Mark J.S. Ma, Walnut, CA (US);
Yungcheng Ma, Walnut, CA (US)

(72) Inventors: Mark J.S. Ma, Walnut, CA (US);
Yungcheng Ma, Walnut, CA (US)

( * ) Notice: Subject to any disclaimer, the term of this patent is extended or adjusted under 35 U.S.C. 154(b) by 0 days.

(21) Appl. No.: 19/351,119

(22) Filed: Oct. 6, 2025

(51) Int. Cl.
*A45B 25/06* (2006.01)
*F16B 5/06* (2006.01)

(52) U.S. Cl.
CPC ............ *F16B 5/0614* (2013.01); *A45B 25/06* (2013.01); *Y10T 403/32861* (2015.01)

(58) Field of Classification Search
CPC ......... A45B 25/02; A45B 25/06; A45B 25/10; Y10T 403/32861; Y10T 403/32877
See application file for complete search history.

(56) References Cited

U.S. PATENT DOCUMENTS

| | | | |
|---|---|---|---|
| 634,018 A | 10/1899 | Mcgee | |
| 950,913 A | 3/1910 | Hartzell | |
| 957,528 A | 5/1910 | Wetteroth | |
| 5,193,566 A | 3/1993 | Chen | |
| 5,372,155 A * | 12/1994 | You | A45B 25/02 |
| | | | 403/178 |
| 5,715,853 A * | 2/1998 | Lin | A45B 25/02 |
| | | | 403/59 |
| 5,746,235 A * | 5/1998 | Lin | A45B 25/02 |
| | | | 135/32 |
| 6,102,058 A * | 8/2000 | You | A45B 25/02 |
| | | | 135/32 |
| 6,311,706 B1 | 11/2001 | Sato | |
| 7,891,367 B2 | 2/2011 | Ma | |
| 8,061,375 B2 | 11/2011 | Ma | |
| 8,082,935 B2 | 12/2011 | Ma | |
| 8,166,986 B2 | 5/2012 | Ma | |
| 9,078,497 B2 | 7/2015 | Ma | |
| 9,271,551 B2 | 3/2016 | Ma | |
| 10,034,524 B2 | 7/2018 | Ma | |
| 10,292,466 B2 | 5/2019 | Ma | |
| 2020/0315306 A1 | 10/2020 | Ma | |

FOREIGN PATENT DOCUMENTS

| | | | |
|---|---|---|---|
| CN | 213939930 U | 8/2021 | |
| KR | 20120107607 A * | 10/2012 | A45B 25/22 |

* cited by examiner

*Primary Examiner* — Michael P Ferguson
(74) *Attorney, Agent, or Firm* — Ying-Ting Chen

(57) ABSTRACT

An interlocking connector assembly for a shading structure includes at least one upper supporting pole; at least one lower supporting pole configured to support under the upper supporting pole; and at least one joint assembly configured to pivotally couple the upper supporting pole with the lower supporting pole; wherein each of the at least one joint assembly includes a first joint member pivotably coupled to a second joint member, and one of the at least one upper supporting pole is passed through the second joint member; wherein each of the first joint members includes at least one locking protrusion configured to slide inside at least one of sliding grooves of the second joint member, wherein the sliding grooves is configured to slidably receive the locking protrusion and retain the locking protrusion without rivet fastening.

16 Claims, 8 Drawing Sheets

INTERLOCKING CONNECTOR ASSEMBLY FOR SHADING STRUCTURE

FIELD OF THE DISCLOSURE

The present disclosure relates generally to connector assemblies for shading structures, and more particularly to an interlocking connector assembly that allows supporting poles to be pivotally connected and retained without the use of rivet fastening.

BACKGROUND OF THE DISCLOSURE

Generally, conventional shading structures, such as outdoor umbrellas, awnings, and tent frames, typically require connector assemblies to join upper and lower supporting poles. In many existing designs, rivets are widely employed to secure joint members together. While rivet fastening provides stable fixation, it also introduces several drawbacks.

First, rivet-based assemblies are generally permanent, which limits the disassembly, repair, or replacement of individual components. Second, riveting requires additional tools and manufacturing steps, which can increase assembly complexity and production cost. Moreover, riveted joints may loosen over time due to repeated loading, vibration, or environmental influences, thereby reducing long-term structural reliability.

Accordingly, there is a need for improved connector assemblies that can provide a secure coupling of supporting poles without relying on rivets. The disclosed embodiments address this need by introducing interlocking protrusions and sliding grooves that enable pivotable engagement and retention between joint members. This configuration not only reduces dependence on rivets but also simplifies assembly and enhances the versatility of shading structures.

All referenced patents, applications, and literature are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, an interlocking connector assembly for a shading structure may comprise at least one upper supporting pole; at least one lower supporting pole configured to support the upper supporting pole and arranged under the upper supporting pole; at least one joint assembly configured to pivotally couple the upper supporting pole with the lower supporting pole; wherein each of the at least one joint assembly comprises a first joint member pivotably coupled to a second joint member, and one of the at least one upper supporting pole is passed through the second joint member; wherein each of the first joint members comprises at least one locking protrusion configured to slide inside at least one of sliding grooves of the second joint member, wherein the sliding grooves is configured to slidably receive the locking protrusion and retain the locking protrusion without rivet fastening.

In another aspect combinable with the general implementation, at least one locking protrusion is rotatable with respect to at least one sliding groove, wherein the first joint member is rotatable with respect to the second joint member to form a rotation angle of 0 to 180 degrees.

Further, it is contemplated that each of the at least one locking protrusion is a cylindrical body and each of the at least one sliding groove is an arc-shaped groove, wherein an outer peripheral surface of the at least one locking protrusion is engaged with the at least one sliding groove to facilitate the locking protrusion being rotated along the sliding grooves.

In the alternative, at least one of the upper supporting poles is not passed through the first joint member.

It is still further contemplated that the second joint member comprises a receiving cavity configured to receive the first joint member and a transversal channel configured to receive the upper supporting pole, wherein the receiving cavity is communicated with the transversal channel.

In another aspect combinable with the general implementation, the first joint member is horizontally passed through a receiving cavity of the second joint member and the upper supporting pole is transversely passed through and moved along a transversal channel of the second joint member, wherein the upper supporting pole is arranged above the at least one locking protrusion to retina the at least one locking protrusion inside the second joint member.

In another aspect combinable with the general implementation, the first joint member is horizontally passed through a receiving cavity of the second joint member and the upper supporting pole is transversely passed through and moved along a transversal channel of the second joint member, wherein the upper supporting pole is biased against the first joint member to secure the first joint member inside the second joint member.

In another aspect combinable with the general implementation, the second joint member comprises a second joint main body, a front protruded portion protruding forward from the second joint main body, and a rear protruded portion protruding rearwardly from the second joint main body, wherein a receiving cavity is formed within the second joint main body and a transversal channel is formed by the front protruded portion protruding, the second joint main body, and the rear protruded portion, wherein the receiving cavity is communicated with the transversal channel.

In another aspect combinable with the general implementation, each of the at least one of sliding grooves of the second joint member is formed on an inner surface of the second joint member and comprises a first sliding groove and a second sliding groove integrally extended from the first sliding groove, wherein the at least one locking protrusion is sliding along the first sliding groove and is received inside the second sliding groove.

In another aspect combinable with the general implementation, each of at least one of the sliding grooves comprises a first sliding groove and a second sliding groove integrally extended from the first sliding groove, wherein an outer peripheral surface of the at least one locking protrusion is engaged with the second sliding groove to facilitate the locking protrusion being rotated along the second sliding groove.

In another aspect combinable with the general implementation, each of the at least one of sliding grooves of the second joint member comprises a first sliding groove and a second sliding groove integrally extended from the first sliding groove, wherein a length of the second sliding groove is longer than a diameter of the at least one locking protrusion to ensure the whole locking protrusion being received inside the second sliding groove.

In another aspect combinable with the general implementation, the second joint member comprises at least one pair of platforms inwardly extended from an inner surface of the second joint member, wherein one of the pair of the platforms may be integrally extended towards a rear protruded portion of the second joint member and the other one of the pair of the platforms may be integrally extended towards the front protruded portion of the second joint member, wherein a second sliding groove is naturally formed between the at least one pair of platforms.

In another aspect combinable with the general implementation, the lower supporting pole is affixed with the first joint member to pivotably move with respect to the second joint member.

In another aspect combinable with the general implementation, the upper supporting pole is affixed with the second joint member by a fastening member, and the lower supporting pole is pivotally moved with respect to the upper supporting pole.

In another aspect combinable with the general implementation, the first joint member comprises a first joint upper portion where the at least one locking protrusion is located and a first joint lower portion that has a hollow structure to pass through the second joint member and expose outside the second joint member, wherein the first joint upper portion is received inside the second joint member.

In another aspect combinable with the general implementation, the first joint member comprises a pair of locking protrusions symmetrically and outwardly extended from a first joint upper portion of the first joint member and the second joint member comprises a pair of sliding groove, wherein one of the pair of the sliding grooves is formed on an opposite side of the other one of the pair of the sliding grooves.

In another aspect combinable with the general implementation, the lower supporting pole is inserted inside and secured inside a first joint lower portion of the first joint member.

In another aspect combinable with the general implementation, the second joint member is a hollow structure having a second joint top opening and a second joint bottom opening arranged on an opposite side of the second joint top opening, wherein the first joint member is passed through the second joint top opening and the second joint bottom opening to be partially locked inside the second joint member.

In another aspect combinable with the general implementation, a diameter of a second joint top opening of a second joint member is larger than a diameter of a second joint bottom opening of the second joint member, and a cross-sectional length of a first joint upper portion is larger than a cross-sectional length of a first joint lower portion to facilitate the first joint upper portion being locked within the second joint member.

In another aspect combinable with the general implementation, a diameter of the second joint top opening is the same as a cross-sectional length of a first joint upper portion of the first joint member, and a diameter of a second joint bottom opening of the second joint member is the same as a cross-sectional length of a first joint lower portion of the first joint member to facilitate the first joint lower portion being passed through the second joint top opening and the second joint bottom opening.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features described in the context of a single implementation can also be implemented separately in multiple implementations or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Furthermore, the steps in such example operations, methods, or processes may be performed in a different succession than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to the precise scale. In reference to the disclosure herein, for purposes of convenience and clarity only, directional terms such as top, bottom, left, right, up, down, above, below, beneath, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

Figure 1:
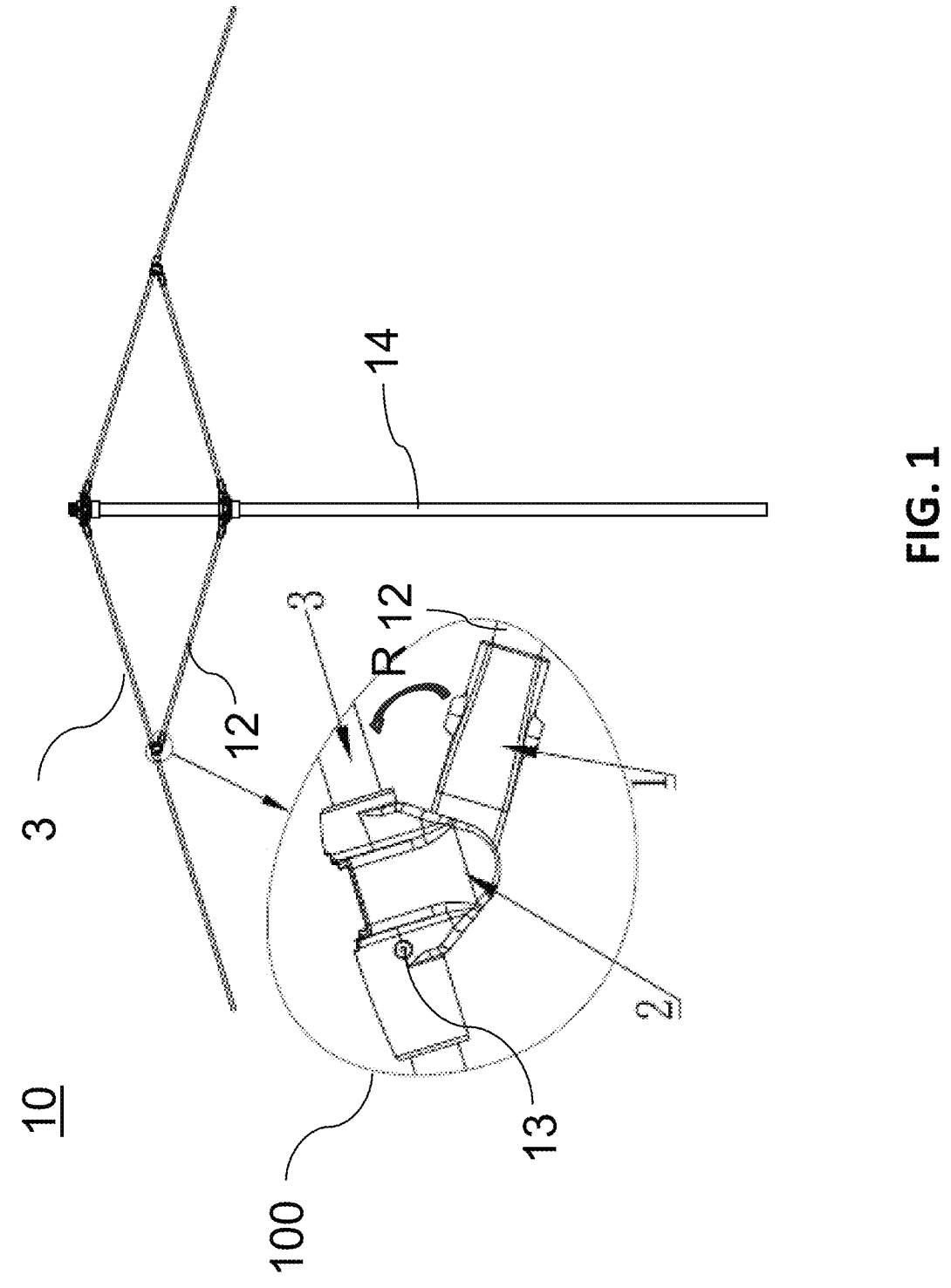
FIG. 1 is a perspective view of an interlocking connector assembly for a shading structure according to an aspect of the embodiments.
Figures 2A, 2B:
FIG. 2A is an exploded view of the interlocking connector assembly showing a first joint member and a second joint member according to an aspect of the embodiments.
FIG. 2B is an exploded view of the interlocking connector assembly showing an upper supporting pole inserting into the second joint member according to an aspect of the embodiments.
Figure 3:
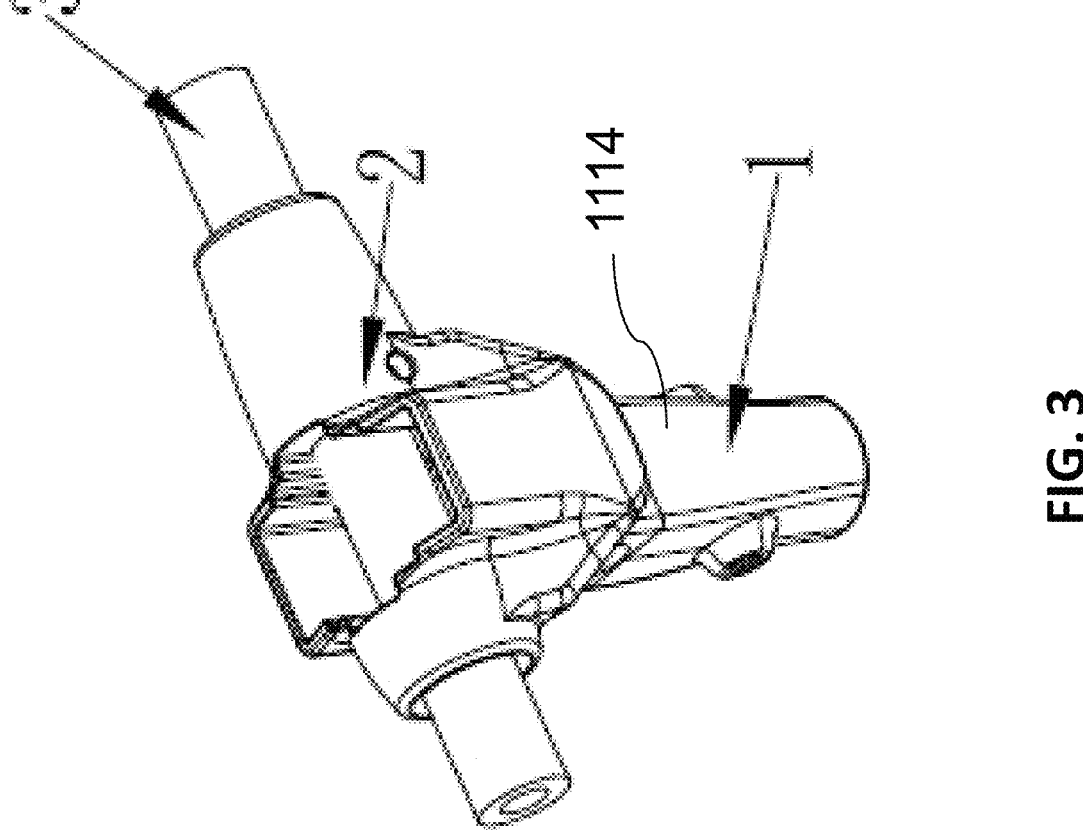
FIG. 3 is a sectional view of the interlocking connector assembly according to an aspect of the embodiment.

FIGS. 1-3 generally depict an interlocking connector assembly for a shading structure, according to an aspect of the embodiments.

Referring to FIG. 1, the interlocking connector assembly 10 may comprise at least one upper supporting pole 3 and at least one lower supporting pole 12 configured to support the upper supporting pole 3 and arranged beneath the upper supporting pole 3. In some embodiments, the interlocking connector assembly 10 may further comprise at least one joint assembly 100 configured to pivotally couple the upper supporting pole 3 with the lower supporting pole 12. In still some embodiments, each of the at least one joint assembly 100 may comprise a first joint member 1 pivotally coupled to a second joint member 2, and one of the at least one upper supporting pole 3 is passed through the second joint member 2.

It should be noted that, in some embodiments, the lower supporting pole 12 may be affixed with the first joint member 1 to pivotally move with respect to the second joint member 2. In addition, the upper supporting pole 3 may be affixed with the second joint member by a fastening member 13, and the lower supporting pole 12 may be pivotally moved with respect to the upper supporting pole 3.

Continuing to FIG. 1, in some embodiments, the interlocking connector assembly 10 may further comprise at least two joint assemblies 100 arranged symmetrically to support at least two upper supporting poles 3 and at least two lower supporting poles 12.

In still some embodiments, the interlocking connector assembly 10 may further comprise a main supporting pole 14 coupled with the upper supporting pole 3 and the lower supporting pole 12, and in such a manner, the upper supporting pole 3 and the lower supporting pole 12 may be supported above the ground by the main supporting pole 14.

Continuing to FIG. 2A and FIG. 2B, each of the first joint members 1 may comprise at least one locking protrusion 111 configured to be slid inside at least one of the sliding grooves 21 of the second joint member 2, wherein the sliding grooves 21 are configured to slidably receive the locking protrusion 111 and retain the locking protrusion 111 without rivet fastening. In some embodiments, at least one sliding groove 21 may be formed on an inner surface of the second joint member 2 and arranged inside the second joint member 2.

In still some embodiments, the first joint member 1 may be horizontally passed through a receiving cavity 22 of the second joint member 2 and the upper supporting pole 3 may be transversely passed through and moved along a transversal channel 23 of the second joint member 2, wherein the first joint member 1 may be partially passed through the second joint member 2. In other words, a part of the first joint member 1 may be passed through the second joint member 2 and be exposed outside, and the rest of the first joint member 1 may be received inside the second joint member 2. It should be noted that the horizontal direction may be vertical to the transversal direction.

Referring to FIG. 3, in some embodiments, while the upper supporting pole 3 is passed through the second joint member 2 and the first joint member 1 is partially passed through the second joint member 2, the upper supporting pole 3 may be arranged above the at least one locking protrusion 111 of the first joint member 1 to retain the at least one locking protrusion 111 inside the second joint member 2. It should be noted that, in some embodiments, one of the at least one upper supporting pole 3 may not pass through the first joint member 1.

Figure 4:
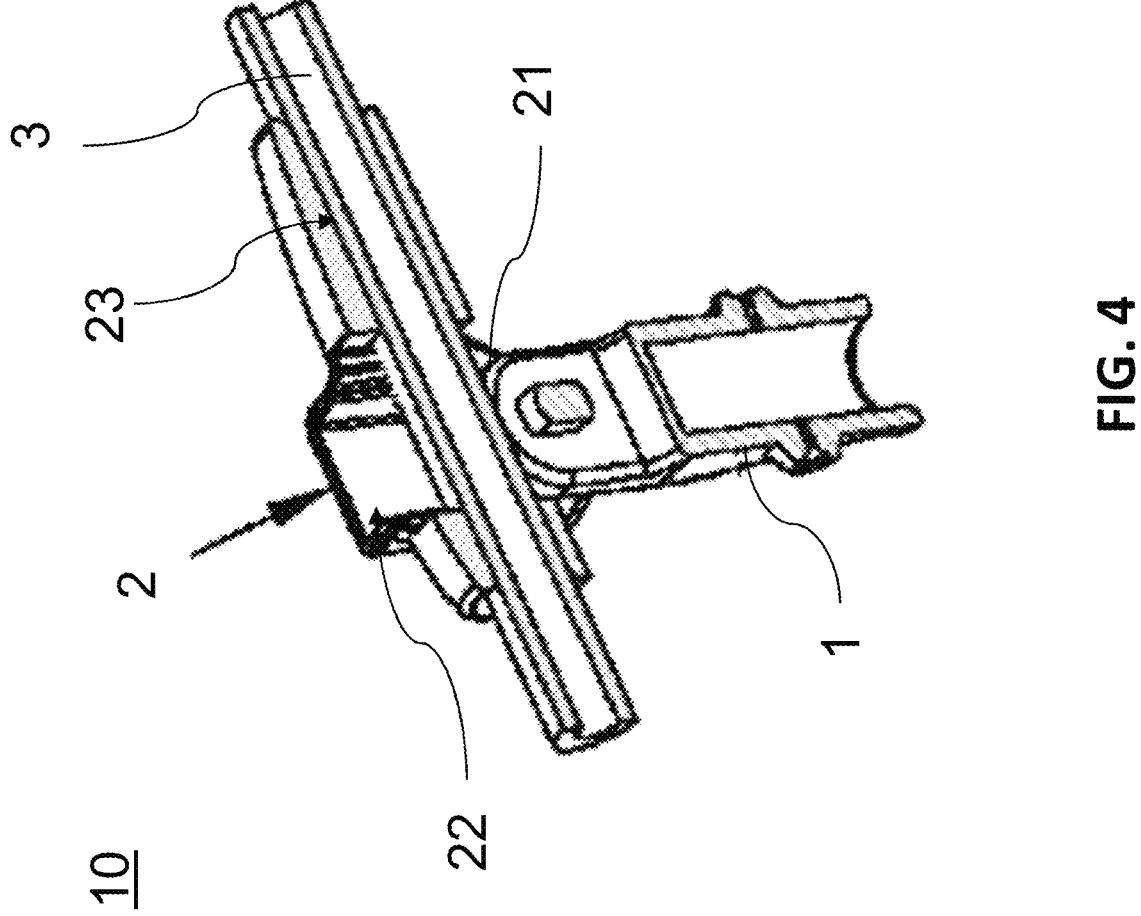
FIG. 4 is a cross-sectional view of the interlocking connector assembly according to an aspect of the embodiment.

FIG. 4 generally depicts a cross-sectional view of the interlocking connector assembly for the shading structure according to an aspect of the embodiments In some embodiments, the at least one locking protrusion 10 may be rotatable with the respect to the at least one sliding groove 21, wherein the first joint member 1 may be rotatable with respect to the second joint member 2 to form a rotation angle "R" from 0 to 180 degrees (also see FIG. 1). In other wors, the rotation angle "R" is defined between the upper supporting pole 3 and the lower supporting pole 12.

In still some embodiments, the upper supporting pole 3 may be biased against the first joint member 1 to secure the first joint member 1 inside the second joint member 2.

In still some embodiments, the second joint member 2 may comprise a receiving cavity 22 configured to receive the first joint member 1 and a transversal channel 23 configured to receive the upper supporting pole 3, wherein the receiving cavity 22 may be communicated with the transversal channel 23.

Referring back to FIG. 3A, FIG. 3B, and 4, the first joint member 1 may be horizontally passed through the receiving cavity 22 of the second joint member 2 and the upper supporting pole 3 may be transversely passed through and moved along the transversal channel 23 of the second joint member 2.

Figure 5:
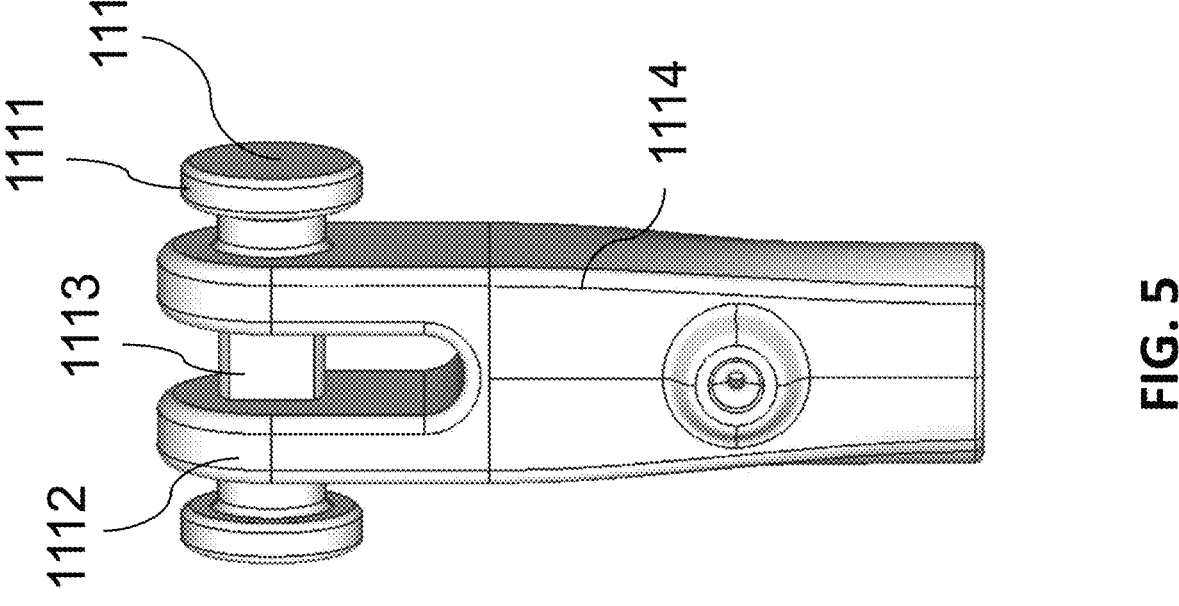
FIG. 5 is a perspective view of the first joint member according to an aspect of the embodiments.
Figures 6A, 6B:
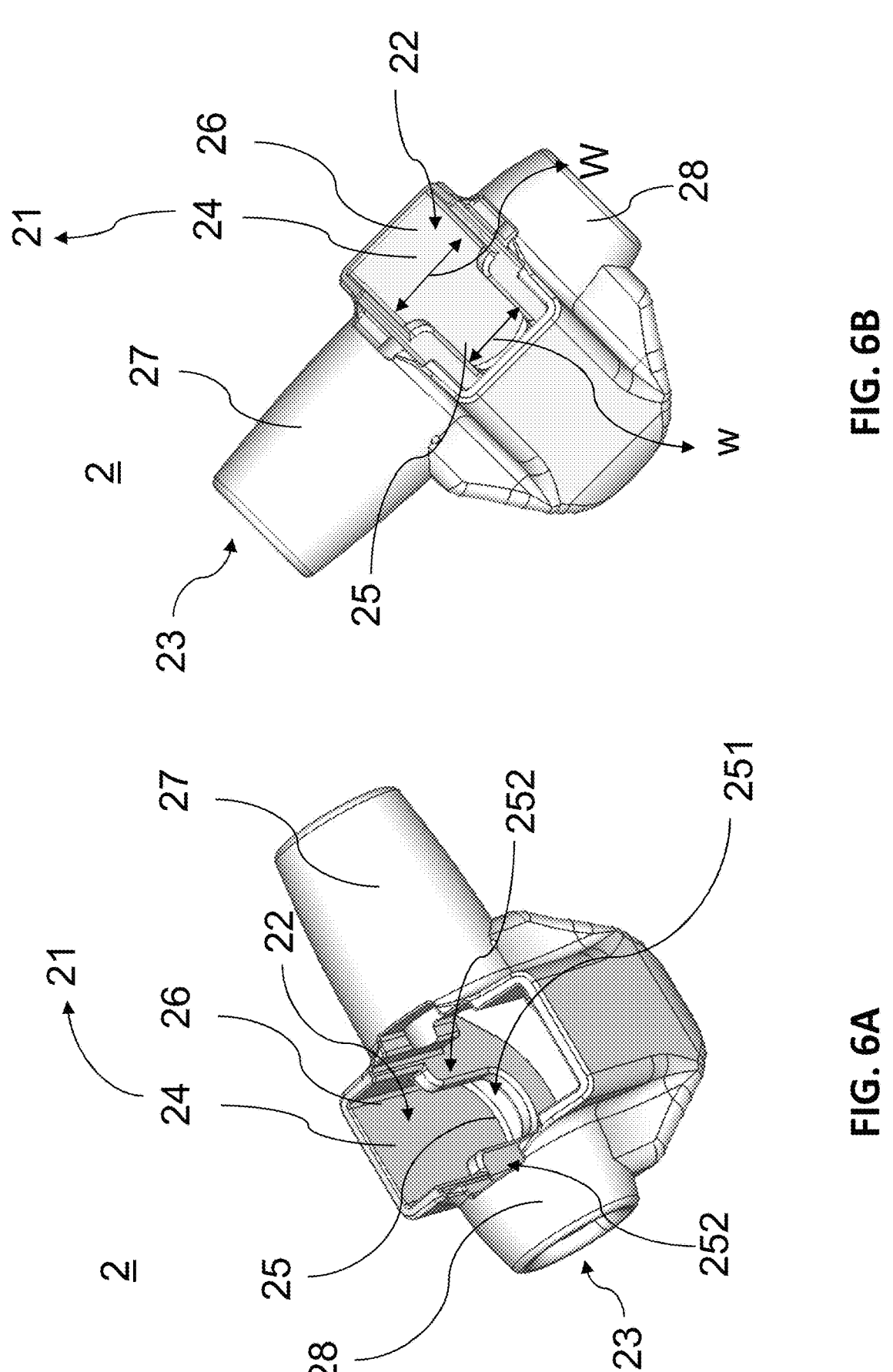
FIG. 6A is an enlarged view of the second joint member according to an aspect of the embodiments.
FIG. 6B is another enlarged view of the second joint member according to an aspect of the embodiments.

FIG. 5, FIG. 6A, and FIG. 6B generally depict perspective views of the first joint member 1 and the second joint member 2, according to an aspect of the embodiments.

Referring to FIGS. 5-6B, each of the at least one locking protrusion 111 may be a cylindrical body and each of the at least one sliding groove 21 is an arc-shaped groove, wherein an outer peripheral surface 1111 of the at least one locking protrusion 111 may be engaged with the at least one sliding groove 21 to facilitate the locking protrusion 111 being rotated along the sliding grooves 21.

In some embodiments, each locking protrusion 111 may be integrally extended from a projecting column 1113 of a first joint top portion 1112 of the first joint member 1, wherein the first joint top portion 1112 may be horizontally and integrally extended and tapered to form the first joint bottom portion 1114, wherein the projection column 1113 may be transversally and extended from the first joint top portion 1112 and being further terminated in a cylindrical body (locking protrusion 111). The locking protrusion 111 may be rotatably and securely received inside a second sliding groove 25 of the sliding groove 21 of the second joint member 2.

In still some embodiments, the first joint member 1 may comprise a pair of locking protrusions 111 symmetrically and outwardly extended from two opposite sides of the first joint upper portion 1112 of the first joint member 1 and the second joint member 2 comprises a pair of sliding grooves 21, wherein one of the pair of the sliding grooves 21 is formed on an opposite side of the other one of the pair of the sliding grooves 21.

As shown in FIG. 6A and FIG. 6B, the second joint member 2 may comprise a second joint main body 26, a front protruded portion 27 protruding forward from the second joint main body 26, and a rear protruded portion 28 protruding rearwardly from the second joint main body 26, wherein the receiving cavity 22 may be formed within the second joint main body 26 and the transversal channel 23 may be formed by the front protruded portion 27, the second joint main body 26, and the rear protruded portion 28, wherein the receiving cavity 22 may be communicated with the transversal channel 23.

Referring to details of FIG. 6A and FIG. 6B, each of the at least one of sliding grooves 21 of the second joint member 2 may be formed inside the second joint member 2 and may comprise a first sliding groove 24 and a second sliding groove 25 integrally extended from the first sliding groove 24, wherein the at least one locking protrusion 111 may be sliding along the first sliding groove 24 and is received inside the second sliding groove 25 (see FIG. 2B).

It should be noted that, in some embodiments, each of the at least one of sliding groove 21 may comprise the first sliding groove 24 and the second sliding groove 25 integrally extended from the first sliding groove 24, wherein the outer peripheral surface 1111 of the at least one locking protrusion 111 may be engaged with an inner wall 251 of the second sliding groove 25 to facilitate the locking protrusion 111 being rotated along the second sliding groove 25 and to allow pivoting movement while preventing disengagement.

Referring to FIG. 5, the first joint member 1 may comprise the first joint upper portion 1112 where the at least one locking protrusion 111 is located and the first joint lower portion 1114 has a hollow structure to pass through the second joint member 2 and expose outside the second joint member 2, wherein the first joint upper portion 1112 may be received inside the second joint member 2. It should be noted that the first joint lower portion 1114 may be integrally extended from the first joint upper portion 1112 to form an elongated hollow structure.

Continuing to FIG. 6A and FIG. 6B, the second joint member 2 may comprise at least one pair of platforms 252 inwardly extended from an inner surface of the second joint member 2, wherein one of the pair of the platforms 252 may be integrally extended towards the rear protruded portion 28 and the other one of the pair of the platforms 252 may be integrally extended towards the front protruded portion 27, and in such a way, the second sliding groove 25 may be naturally formed between the at least one pair of platforms 252.

In still some embodiments, each of the at least one of sliding grooves 21 of the second joint member 2 may comprise the first sliding groove 24 and the second sliding groove 25 integrally extended from the first sliding groove 24, wherein a width "W" of the first sliding groove 24 may be longer than a width "w" of the second sliding groove 25, and at this situation, each of the at least one locking protrusion 111 may be slid along the first sliding groove 24 and further slide into the second sliding groove 25 and being secured inside the second sliding groove 25.

Figure 7B:
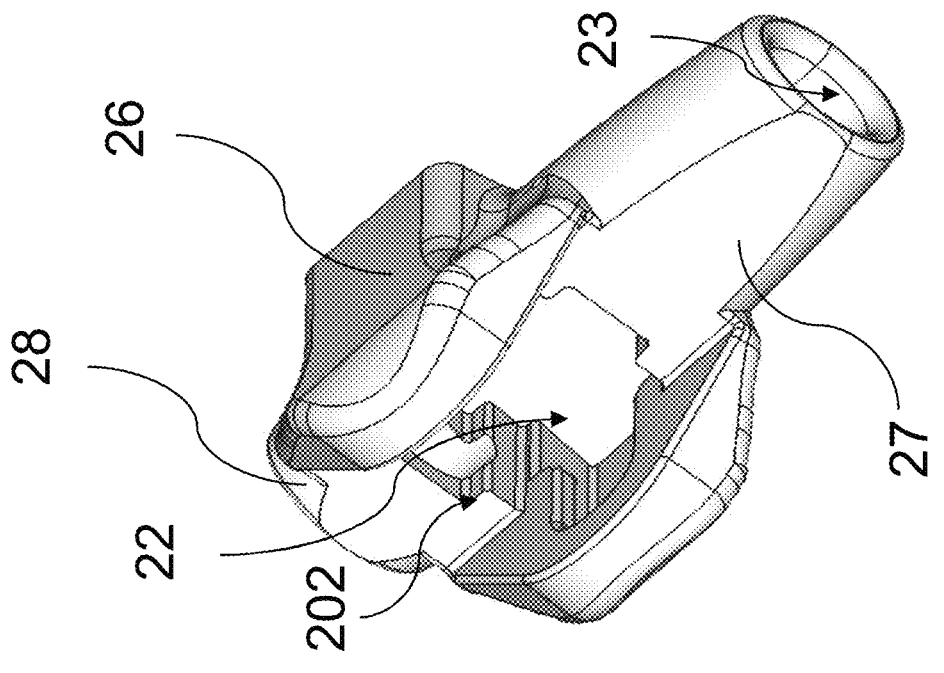
FIG. 7B is a bottom view of the second joint member according to an aspect of the embodiments.
Figure 7B:
Figure 7A:
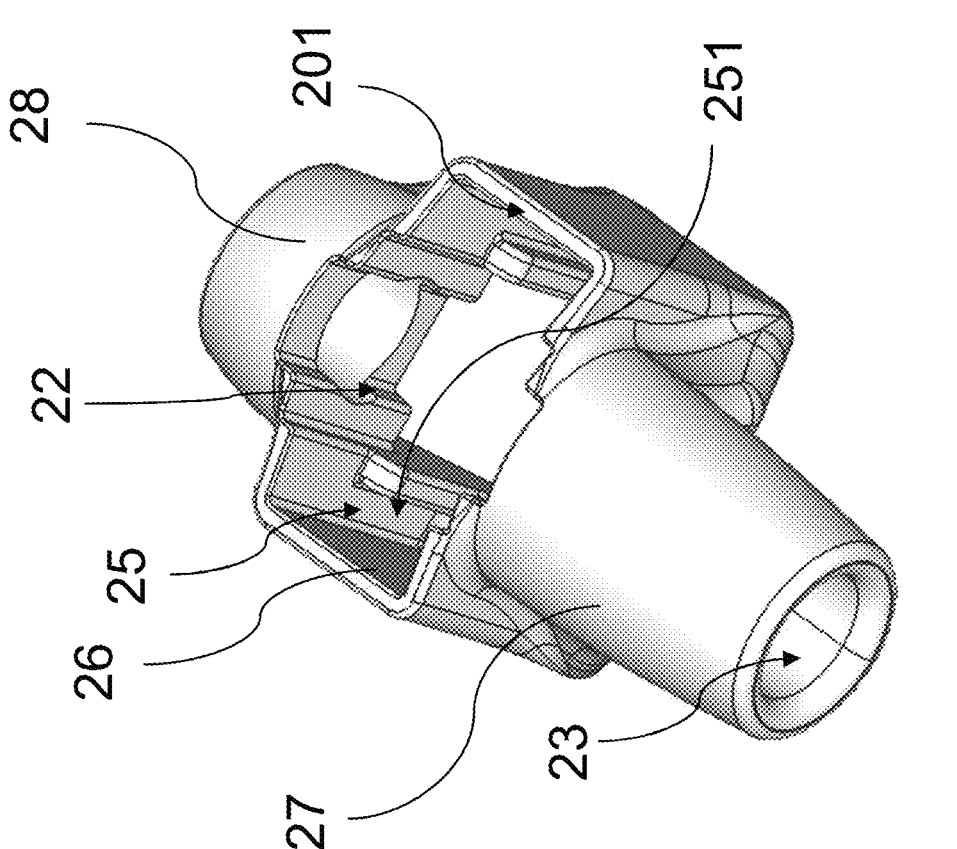
FIG. 7A is a top view of the second joint member according to an aspect of the embodiments.

FIG. 7A and FIG. 7B generally depict the second joint member 2 of the interlocking connector assembly according to an aspect of the embodiment.

Referring to FIG. 7A and FIG. 7B, the second joint member 2 may be a hollow structure having a second joint top opening 201 and a second joint bottom opening 202 arranged on an opposite side of the second joint top opening 201, wherein the first joint member 1 may be passed through the second joint top opening 201 and the second joint bottom opening 202 to be partially locked inside the second joint member 2.

It should be noted that, also referring back to FIG. 3 and FIG. 5, while the first joint upper portion 1112 is passed through the second joint top opening 201 and being retained inside the second joint member and the first joint lower portion 1114 is passed through the second joint bottom opening 202, the second joint bottom opening 202 is blocked by the first joint member 1, and at the same time, the upper supporting pole 3 is passed through the second joint member 2 to block the second joint top opening 201, and in such a situation, the first joint member 1 may be blocked by the upper supporting pole 3 to preventing the first joint member 1 being falling out of the second joint member 2 through the second joint top opening 201.

Figure 8:
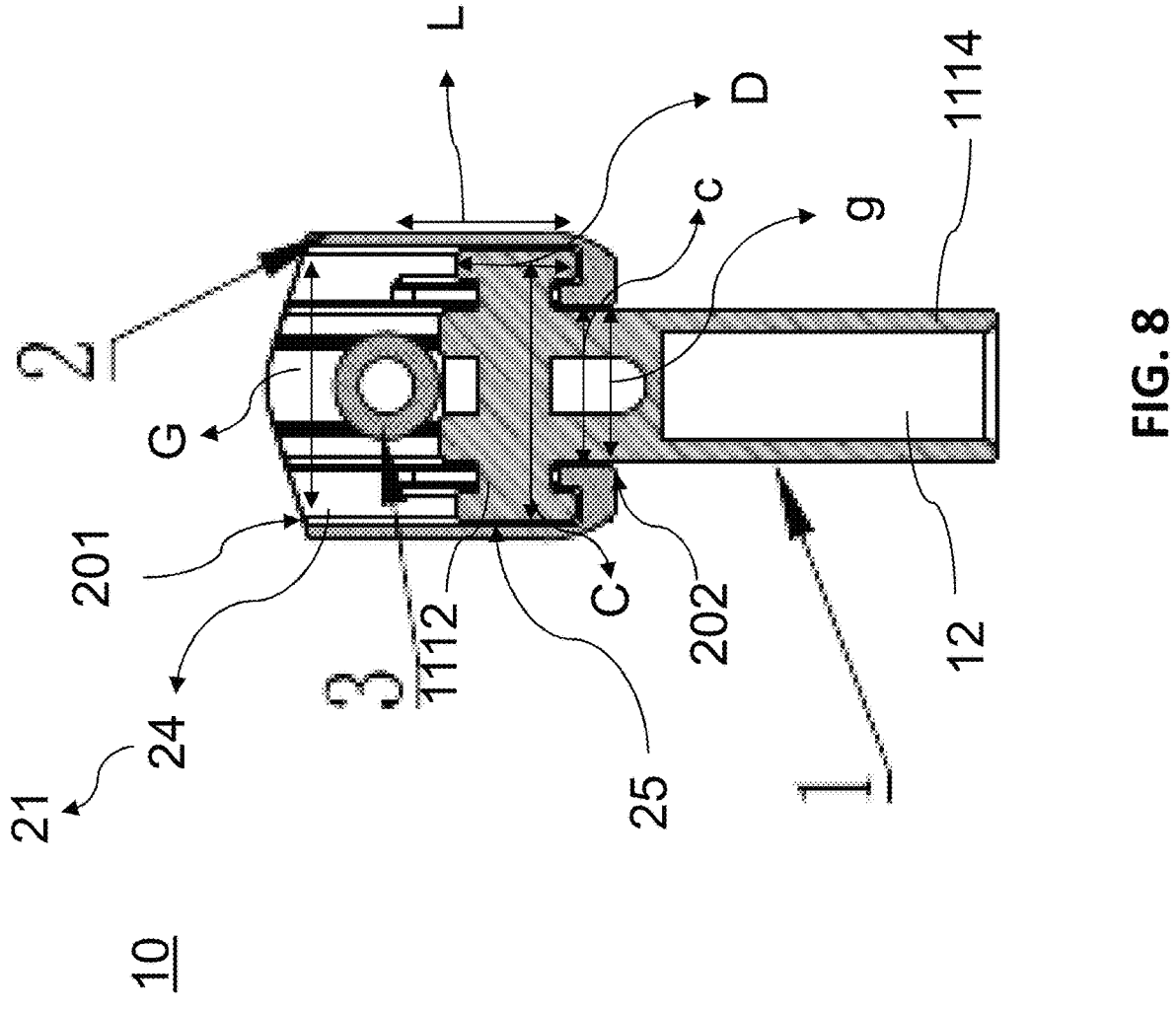
FIG. 8 is a cross-sectional view of the interlocking connector assembly according to an aspect of the embodiments.

FIG. 8 generally depicts a cross-sectional view of the interlocking connector assembly according to an aspect of the embodiment.

Referring to FIG. 8, in some embodiments, each of the at least one of sliding grooves 21 of the second joint member 2 may comprise the first sliding groove 24 and the second sliding groove 25 integrally extended from the first sliding groove 24, wherein a length "L" of the second sliding groove 25 is longer than a diameter "D" of each of the at least one locking protrusion 111 to ensure the whole locking protrusion 111 being received inside the second sliding groove 25.

It should be noted that, in still some embodiments, a diameter "G" of a second joint top opening 201 of the second joint member 2 may be larger than a diameter "g" of a second joint bottom opening 202 of the second joint member 2, and a cross-sectional length "C" of the first joint upper portion 1112 may be larger than a cross-sectional length "c" of a first joint lower portion 1114, and in such a way the first joint upper portion 1112 may be locked within the second joint member 2. It should be noted that the second joint top opening 201 is gradually tapered to form the second joint bottom opening 202, and the receiving cavity 22 may be a tapered cavity, thereby preventing the first joint member 1 from unintentionally disengaging.

In other words, in some embodiment, a diameter "G" of the second joint top opening 201 may be the same as a cross-sectional length "C" of the first joint upper portion 1112. A diameter "g" of a second joint bottom opening 202 of the second joint member 2 may be the same as a cross-sectional length "c" of the first joint lower portion 1114. In this situation, the first joint lower portion 1114 may be passed through the second joint top opening 201 and the second joint bottom opening 202, and the first joint lower portion 1114 may be locked inside the second joint member 2.

Additionally, in some embodiments, the lower supporting pole 12 may be inserted inside and secured inside the first joint lower portion 1114 of the first joint member 1.

In still some embodiments, each of the sliding grooves 21 may be oriented transversely to a longitudinal axis of the upper supporting pole 3.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of an inter-locking connector assembly for a shading structure have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the speci-fication and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted, and also what essentially incorpo-rates the essential idea of the embodiments. In addition, where the specification and claims refer to at least one of something selected from the group consisting of A, B, C . . . , and N, the text should be interpreted as requiring at least one element from the group, which includes N, not A plus N, or B plus N, etc.

The words used in this specification to describe the various embodiments are to be understood not only in the sense of their commonly defined meanings, but to include by special definition in this specification structure, material, or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims therefore include not only the combination of ele-ments which are literally set forth, but all equivalent struc-ture, material or acts for performing substantially the same function in substantially the same way to obtain substan-tially the same result. In this sense, it is therefore contem-plated that an equivalent substitution of two or more ele-ments may be made for any one of the elements in the claims below, or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. An interlocking connector assembly for a shading structure, comprising:

at least one upper supporting pole;

at least one lower supporting pole, each lower supporting pole configured to couple with a corresponding at least one upper supporting pole and arranged under the upper supporting pole; and at least one joint assembly, each joint assembly configured to pivotally couple a respective at least one upper supporting pole with a corresponding at least one lower supporting pole;

wherein each joint assembly comprises a first joint mem-ber in which the at least one lower supporting pole is inserted inside and a second joint member rotatably coupled to the first joint member and coupled to the at least one upper supporting pole;

wherein the first joint member is affixed to an upper end of the lower supporting pole and comprises at least one locking protrusion extending therefrom;

wherein the second joint member is a hollow structure comprising a receiving cavity vertically extending therethrough between a second joint top opening and an opposing second joint bottom opening thereof, at least one sliding groove formed within the receiving cavity configured to slidably receive the at least one locking protrusion, and a transversal channel extending there-through transverse to the receiving cavity;

wherein a lower end of the lower supporting pole is vertically passed through the second joint top opening, the receiving cavity, and the second joint bottom open-ing such that the at least one locking protrusion is slidably and rotatable received within the at least one sliding groove, and the upper supporting pole is sub-sequently transversely passed through the transversal channel above the at least one locking protrusion to block the second joint top opening and to retain the at least one locking protrusion inside the second joint member.

2. The interlocking connector assembly of claim 1, wherein each of the at least one locking protrusion is a cylindrical body and each of the at least one sliding groove is an arc-shaped groove, wherein an outer peripheral surface of the at least one locking protrusion is engaged with an inner wall of a second sliding groove of the at least one sliding groove to facilitate the locking protrusion being rotated along the sliding grooves.

3. The interlocking connector assembly of claim 1, wherein each of the at least one upper supporting pole is not passed through the first joint member.

4. The interlocking connector assembly of claim 1, wherein the receiving cavity is tapered and communicates with the transversal channel.

5. The interlocking connector assembly of claim 1, wherein the upper supporting pole is pressed against the first joint member to secure the first joint member inside the second joint member.

6. The interlocking connector assembly of claim 1, wherein the second joint member comprises a second joint main body, a front protruded portion protruding forwardly from the second joint main body, and a rear protruded portion protruding rearwardly from the second joint main body, wherein the receiving cavity is formed within the second joint main body and the transversal channel is formed by the front protruded portion, the second joint main body, and a rear protruded portion.

7. The interlocking connector assembly of claim 1, wherein each of the at least one of sliding grooves of the second joint member is formed on an inner surface of the second joint member and arranged inside the second joint member and comprises a first sliding groove and a second sliding groove integrally extended from the first sliding groove, wherein the at least one locking protrusion slides along the first sliding groove and is received inside the second sliding groove.

8. The interlocking connector assembly of claim 1, wherein each of the at least one sliding grooves comprises a first sliding groove and a second sliding groove integrally extended from the first sliding groove, wherein an outer peripheral surface of the at least one locking protrusion is engaged with the second sliding groove to facilitate the locking protrusion being rotated along the second sliding groove.

9. The interlocking connector assembly of claim 1, wherein each of the at least one sliding grooves of the second joint member comprises a first sliding groove and a second sliding groove integrally extended from the first sliding groove, wherein a length of the second sliding groove is longer than a diameter of the at least one locking protrusion to ensure the whole locking protrusion being received inside the second sliding groove.

10. The interlocking connector assembly of claim 1, wherein the second joint member comprises at least one pair of platforms inwardly extended from an inner surface of the second joint member, wherein one of the pair of the platforms may be integrally extended towards a rear protruded portion of the second joint member and the other one of the pair of the platforms may be integrally extended towards a front protruded portion of the second joint member, wherein a second sliding groove is naturally formed between the at least one pair of platforms.

11. The interlocking connector assembly of claim 1, wherein the upper supporting pole is affixed with the second joint member by a fastening member.

12. The interlocking connector assembly of claim 1, wherein the first joint member comprises a first joint upper portion where the at least one locking protrusion is located and a first joint lower portion has a hollow structure to pass through the second joint member and be exposed outside the second joint member, wherein the first joint upper portion is received inside the second joint member.

13. The interlocking connector assembly of claim 1, wherein the first joint member comprises a pair of locking protrusions symmetrically and outwardly extended from a first joint upper portion of the first joint member and the second joint member comprises a pair of sliding grooves, wherein one of the pair of the sliding grooves is formed on an opposite side of the other one of the pair of the sliding grooves.

14. The interlocking connector assembly of claim 1, wherein the first joint member comprises a first joint upper portion and a first joint lower portion integrally tapered and extended from the first joint upper portion.

15. The interlocking connector assembly of claim 1, wherein a diameter of the second joint top opening of the second joint member is larger than a diameter of the second joint bottom opening of the second joint member, and a cross-sectional length of a first joint upper portion of the first joint member is larger than a cross-sectional length of a first joint lower portion of a first joint member to facilitate the first joint upper portion being locked within the second joint member.

16. The interlocking connector assembly of claim 15, wherein the diameter of the second joint top opening is the same as the cross-sectional length of the first joint upper portion of the first joint member, and the diameter of the second joint bottom opening of the second joint member is the same as the cross-sectional length of a first joint lower portion of a first joint member to facilitate the first joint lower portion being passed through the second joint top opening and the second joint bottom opening.

\* \* \* \* \*